(12) United States Patent
Abbott et al.

(10) Patent No.: US 7,212,394 B2
(45) Date of Patent: May 1, 2007

(54) APPARATUS AND METHOD FOR BANDING THE INTERIOR SUBSTRATE OF A TUBULAR DEVICE AND THE PRODUCTS FORMED THEREFROM

(75) Inventors: Timothy M. Abbott, Corry, PA (US); Walter B. Woodward, Venango, PA (US)

(73) Assignee: Corry Micronics, Inc., Corry, PA (US)

( * ) Notice: Subject to any disclaimer, the term of this patent is extended or adjusted under 35 U.S.C. 154(b) by 15 days.

(21) Appl. No.: 10/870,369

(22) Filed: Jun. 17, 2004

(65) Prior Publication Data

US 2005/0280976 A1    Dec. 22, 2005

(51) Int. Cl.
*H01G 4/00* (2006.01)
(52) U.S. Cl. ............... 361/301.3; 361/301.2; 361/303; 361/508; 361/516; 361/523; 361/525; 29/25.01; 29/25.03
(58) Field of Classification Search ............. 361/301.3, 361/301.2, 303, 321.6, 508–516, 519–528; 29/25.01–25.03
See application file for complete search history.

(56) References Cited

U.S. PATENT DOCUMENTS

| | | | | |
|---|---|---|---|---|
| 4,221,033 A | * | 9/1980 | Kobayashi | ............... 29/25.42 |
| 4,593,341 A | * | 6/1986 | Herczog | .............. 361/310 |
| 4,845,588 A | * | 7/1989 | Sillner | .............. 361/321.6 |
| 5,141,774 A | | 8/1992 | Prittinen et al. | |
| 5,534,060 A | | 7/1996 | Johnson | |
| 6,031,713 A | * | 2/2000 | Takeishi et al. | ............ 361/517 |
| 6,106,969 A | * | 8/2000 | Lian et al. | .............. 429/90 |
| 6,309,693 B1 | | 10/2001 | Wallace et al. | |
| 6,310,756 B1 | * | 10/2001 | Miura et al. | .............. 361/301.3 |
| 6,831,825 B1 | * | 12/2004 | McWhorter | .............. 361/321.6 |
| 2001/0003348 A1 | | 6/2001 | Dudanowicz | |
| 2004/0027769 A1 | | 2/2004 | Denison et al. | |

* cited by examiner

*Primary Examiner*—Nguyen T. Ha
(74) *Attorney, Agent, or Firm*—Kirkpatrick & Lockhart Preston Gates Ellis LLP

(57) ABSTRACT

Apparatus and method for depositing a banding material on the interior substrate of a tubular device, and the products formed therefrom. The tubular device is, generally, of relatively small diameter and comprises at least one band deposited from a first composition on the interior substrate. When the tubular device is a tubular capacitor and the band is a plating mask, the tubular capacitor comprises at least two electrodes deposited on the substrate in the presence of a deposited plating mask and comprises at least one conductive layer, deposited from a first composition, on the substrate and separated by the plating mask.

31 Claims, 3 Drawing Sheets

"Pi" Filter
Cross Section

Multi Section Filter
Cross Section

APPARATUS AND METHOD FOR BANDING THE INTERIOR SUBSTRATE OF A TUBULAR DEVICE AND THE PRODUCTS FORMED THEREFROM

FIELD OF THE INVENTION

The present invention relates to an apparatus and method for banding the interior substrate of tubular devices, such as tubular capacitors, and the products formed therefrom.

BACKGROUND OF THE INVENTION

Small diameter tubular devices have been found to provide critical advantages in numerous and varied industrial applications. These applications range from catheters and stents in the medical industry to tubular capacitors in the electronics industry. For example, tubular devices, such as Pi capacitors, are well known devices used in RFI (radio frequency interference) and EMI (electromagnetic interference) filters for high frequency applications. Typically, the capacitors are composed of various electronics grade ceramic compositions that have a wide range of electrical properties, which include, but are not limited to, "K" (dielectric constant) and "TC" (temperature coefficient). These basic tubular forms, referred to as the dielectric, are manufactured using various conventional manufacturing processes.

In one method, the capacitor is subjected to the application of a thick film conductor (i.e. electrode), typically in the form of a mixture of silver, glass frit, and organic binders, by mechanical or dipping methods. The thick film material is applied from each end of the axis onto the wall of the inside diameter to, typically, a distance shorter than the center point of the axial length. In this method, the thick film material is coated on the interior substrate of the capacitor to slightly less than half the length from each end of the capacitor. Accordingly, the wall of the interior substrate at or about the center of the axial length is void of the thick film conductor material, which provides electrical insulation between the two inside electrodes. The device is then coated on the surface of the outside diameter with a thick film conductor to form the ground electrode and is, thereafter, subjected to a drying and sintering process to bond the thick film conductors to the device.

It is well recognized that forming small diameter tubular devices, such as by the method described above, is both time consuming and labor intensive. For example, the prior art method set forth above is generally effective in forming a two electrode capacitor, but requires significant allocations of time and manpower to do so. In addition, this method provides the formation of Pi (i.e., two electrode-containing) capacitors used in the electronics industry, but offers limited or no manufacturing flexibility in other electronics applications or applications in other industries. Even with automation, the cycle time for coating each tubular device employing conventional methods is relatively slow. Typical dimensional variations of the tubular devices also affect the yield and quality output from the prior art methods.

In light of these drawbacks, there is a need to manufacture tubular devices, such as tubular capacitors, in a more cost-effective manner and by methods that provide greater manufacturing flexibility, such that one or more annular bands may be formed on the interior substrate with greater speed and accuracy, which allows for a greater product output and reduced manufacturing cost.

BRIEF SUMMARY OF THE INVENTION

The present invention addresses one or more of the above-mentioned needs by providing a tubular device comprising an interior substrate defining an opening having a diameter of less than 0.75 inches and at least one band deposited from a first composition on the interior substrate, the at least one band being deposited on the substrate at a band width tolerance of +/−0.010 inches.

The present invention also provides a tubular capacitor comprising an interior substrate defining an opening through the capacitor and at least two capacitor electrodes deposited on the interior substrate. The at least two electrodes are deposited on the substrate in the presence of a deposited plating mask and comprise at least one conductive layer, deposited from a first composition, on the substrate and separated by the plating mask.

In another embodiment, the present invention provides a tubular capacitor comprising an interior substrate defining an opening through the capacitor and at least two capacitor electrodes directly deposited on the interior substrate and separated by the presence of a deposited plating mask. The at least two electrodes are deposited in the absence of a fired on metal layer, and comprise a first coating layer deposited from a first composition and a second coating layer deposited from a second composition over at least a portion of the first coating layer.

The present invention also provides a tubular capacitor comprising an interior substrate defining an opening through the capacitor and at least two capacitor electrodes deposited on the interior substrate. The at least two electrodes are deposited on the substrate in the presence of and separated by a deposited plating mask. The at least two electrodes comprise a multiple layered composite coating comprising a first coating layer deposited from a first composition directly on the substrate, a second coating layer deposited from a second composition over at least a portion of the first coating layer, and a third coating layer deposited from a third composition over at least a portion of the second coating layer.

Also provided is a single component tubular capacitor comprising an interior substrate defining an opening through the single component tubular capacitor and at least three capacitor electrodes deposited on the interior substrate and separated from one another by a plating mask.

The present invention also provides a method of banding a tubular device, comprising providing a tubular device having an interior substrate defining an opening therethrough, and depositing at least one band on the interior substrate. The opening has a diameter of less than 0.75 inches. The at least one band is deposited on the substrate at a band width tolerance of +/−0.010 inches.

In another embodiment, the present invention provides a method of forming at least two capacitor electrodes on an interior substrate defining an opening through a tubular capacitor. The method comprises depositing at least one plating mask on the interior substrate from a plating mask composition, and depositing an electrically conductive first composition on the interior substrate such that at least two capacitor electrodes are formed on the substrate and separated by the at least one plating mask.

Also provided is a method of forming at least three capacitor electrodes on an interior substrate of a single component tubular capacitor, comprising: depositing at least two plating masks on the interior substrate from a plating mask composition, the plating masks spaced apart by a predetermined distance; depositing from an electrically conductive first composition at least three first coating layers on the surface of the interior substrate in the absence of a fired on metal layer, such that each first coating layer is separated from one another by each plating mask; depositing from an electrically conductive second composition a second coating layer over at least a portion of each of the at least three first coating layers; and depositing from an electrically conductive third composition a third coating layer over at least a portion of each of the second coating layers such that at least three capacitor electrodes are formed on the interior substrate, each electrode being separated from one another by each plating mask.

The present invention also provides an apparatus for banding at least a portion of an interior substrate that defines an opening through a tubular device. The apparatus comprises a drive member and a deposition nozzle in cooperative engagement with the drive member to provide rotational movement to the nozzle. The nozzle has at least one open end and is suitably sized to be at least partially inserted into the opening, and a tapered interior wall such that a cross-sectional diameter a at a distance x from the open end is less than a diameter b at a distance y from the open end, and the distance x is greater than the distance y from the open end.

It should be understood that this invention is not limited to the embodiments disclosed in this Summary, and it is intended to cover modifications that are within the spirit and scope of the invention, as defined by the claims.

BRIEF DESCRIPTION OF THE DRAWINGS

The characteristics and advantages of the present invention may be better understood by reference to the accompanying drawings, wherein like reference numerals designate like elements and in which.

DETAILED DESCRIPTION OF THE INVENTION

Figure 1:
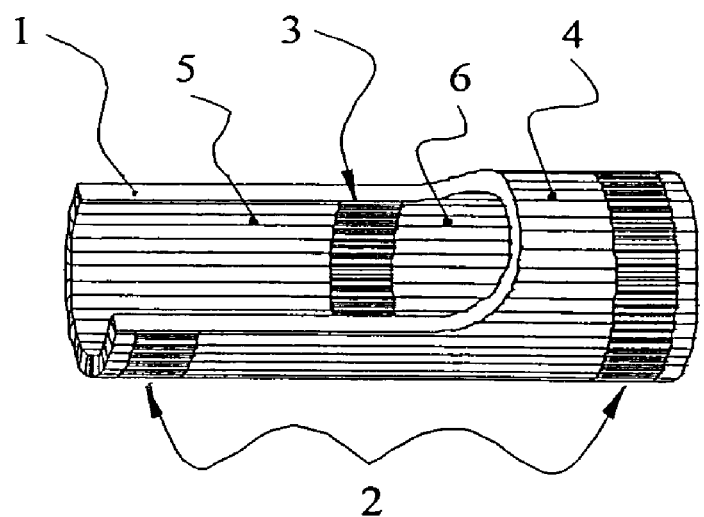
FIG. 1 is a sectional view of a single banded tubular capacitor of the present invention.

The present invention relates to an apparatus and a method of applying one or more annular bands of a deposited banding material to the interior substrate (i.e., inside diameter) of a tubular device having relatively small inside diameters. In particular, the tubular device of the present invention may be a tubular capacitor used in, for example, RFI (radio frequency interference) and EMI (electromagnetic interference) filters. Where the tubular device is a tubular capacitor, the product formed therefrom may be a single component device with at least two capacitor electrodes separated from each other by the deposited banding material, such as a plating mask. It will be understood, however, that the invention is not limited to embodiment in such form and may have application in various tubular devices having relatively small inside diameters. For example, the apparatus and method of the present invention may be employed to deposit material on the interior substrate of various small diameter tubular devices, such as, for example, catheters, stents, and the like employed in the medical industry. Thus, while the present invention is capable of embodiment in many different forms, for ease of description this detailed description and the accompanying drawings disclose only specific forms as examples of the invention. Those having ordinary skill in the relevant art will be able to adapt the invention to application in other forms not specifically presented herein based upon the present description.

Also, for ease of description, the invention and devices to which it may be attached may be described and/or illustrated herein in a normal operating position, and terms such as upper, lower, front, back, horizontal, proximal, distal, etc., may be used with reference to the normal operating position of the referenced device or element. It will be understood, however, that the apparatus of the invention may be manufactured, stored, transported, used, and sold in orientations other than those described and/or illustrated.

Other than in the operating examples, or unless otherwise expressly specified, all of the numerical ranges, amounts, values and percentages such as those for amounts of materials, and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

As used herein, the term "single component" refers to seamless and continuous tubular devices that are of one piece, in contrast to "multiple component" tubular devices that comprise two or more separate and divided tubular sections that are attached following coating to form a single "multiple component" device. The term "banding" refers to the application of at least one annular band on the tubular device.

Figure 2:
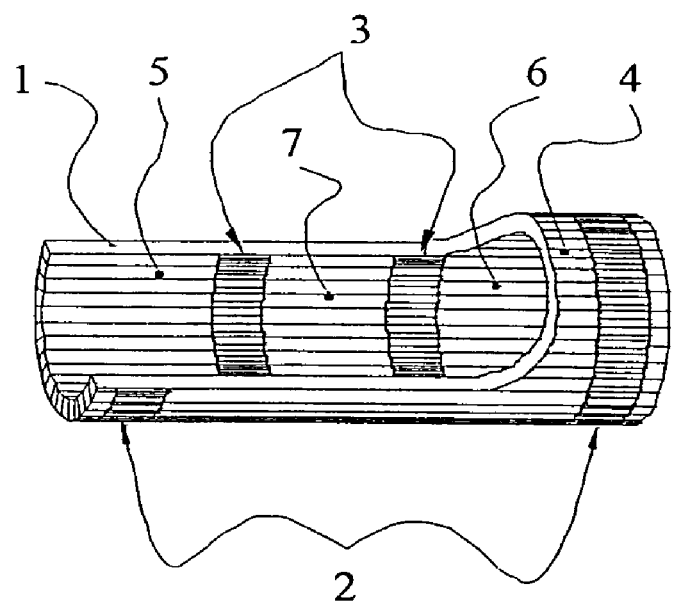
FIG. 2 is a sectional view of a multiple banded tubular capacitor of the present invention.

Referring now to the drawings, which are for the purpose of illustrating embodiments of the invention and not for the purpose of limiting the same, FIGS. 1 and 2 depict embodiments of a tubular device constructed according to the present invention in the form of a tubular capacitor or dielectric 1. In this form, and as discussed in detail below, the tubular capacitor 1 may include one or more annular bands 3, in the form of, for example, a plating mask, deposited on the interior substrate that defines an opening or bore through the capacitor 1. The deposition of the plating mask assists in subsequent capacitor formation steps, such as the deposition and adhesion of conductive plating layers in the form of conductive electrodes 5, 6, and 7. In embodiments where the tubular device is a device other than tubular capacitor 1, such as, for example, a tubular medical device, subsequent processing steps following the deposition of the annular bands 3 may not be necessary.

The tubular device may be formed of any material known to those of ordinary skill in the art. When the tubular device is a tubular capacitor 1, for example, the capacitor 1 may be formed of any suitable non-conductive material or composite, such as, ceramic, plastic, glass, and combinations thereof. In embodiments where the tubular device 1 is a medical device such as a stent or a catheter, various materials well known in the medical art may be employed, such as various forms of plastics, stainless steel wire mesh material, and the like. By "plastic" is meant any of the common thermoplastic or thermosetting synthetic nonconductive materials, including, for example, thermoplastic olefins such as polyethylene and polypropylene, thermoplastic urethane, polycarbonate, thermosetting sheet molding compound, reaction-injection molding compound, acrylonitrile-based materials, nylon, fluorocarbon-based materials, epoxy-based materials, and the like.

The present invention is particularly directed to a tubular device that has an interior substrate that defines a relatively small opening or bore passing therethrough. In particular, the opening through the tubular device may have a generally circular cross section and a diameter of less than 0.75 inches. In some embodiments of the present invention, the diameter of the opening defined by the interior substrate is in the range of 0.04 to 0.3 inches, and may be in the range of 0.04 to 0.10 inches. Suitable ceramic devices are commercially available from Corry Micronics, Inc., Corry, Pa.

Figure 3:
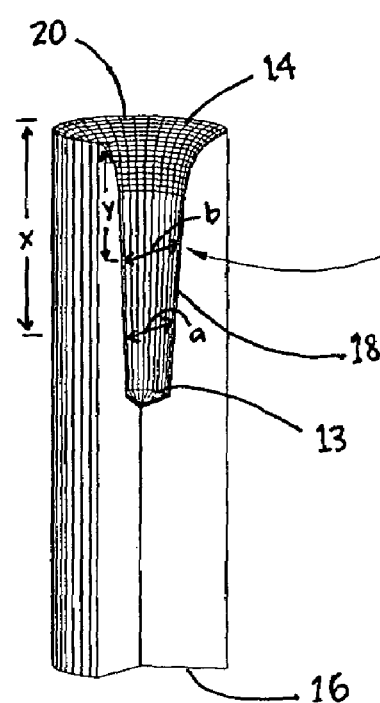
FIG. 3 is a section view of a horn-shaped nozzle of the apparatus of the present invention.
Figure 4:
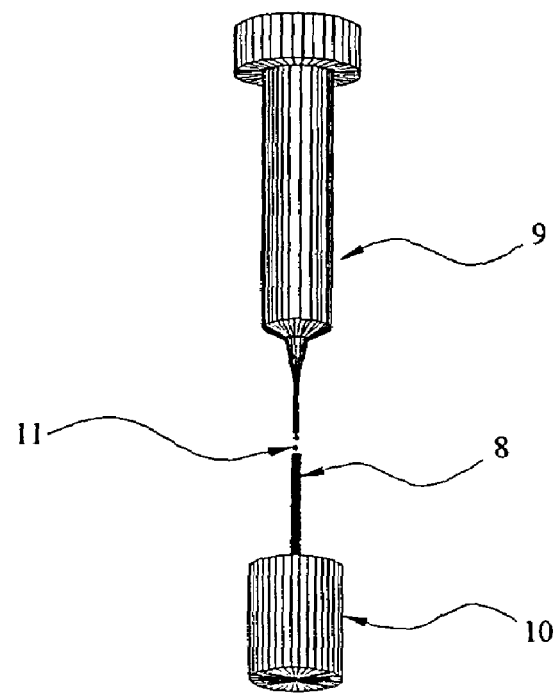
FIG. 4 is a view illustrating the dispensing of the banding material into the nozzle of the present invention.
Figure 5:
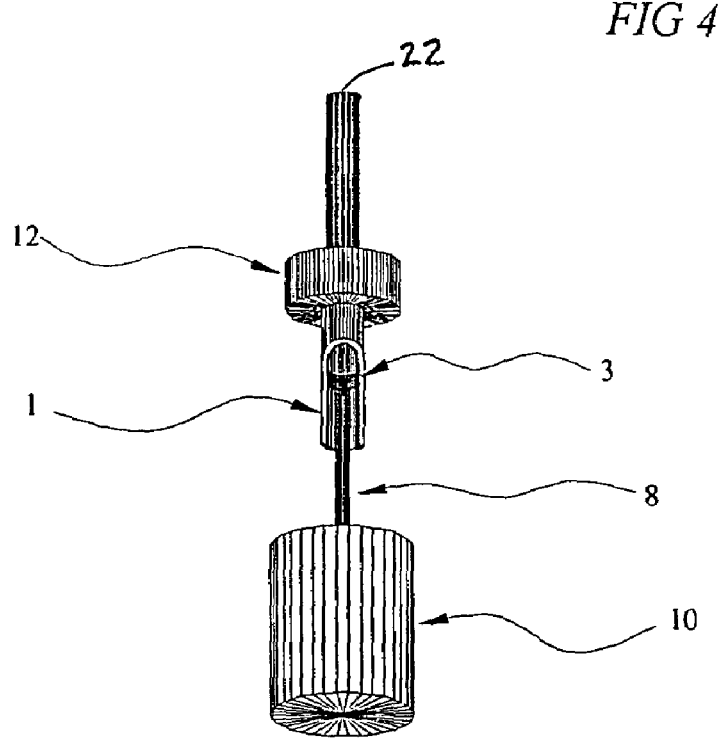
FIG. 5 is a view illustrating the deposition of the banding material onto the interior substrate of the tubular capacitor of FIG. 1.

Turning now to FIGS. 3–5, the present invention provides an apparatus and method of depositing one or more annular bands 3 on the interior substrate of the tubular device. The annular band 3 may be formed of any banding material that, when applied as a band in an interior substrate of a tubular device provides some structural, operating, or manufacturing advantage relative to a tubular device that does not have such annual band. For example, when the tubular device is a tubular capacitor 1, as illustrated, the annular band 3 may be formed from a plating mask or resist material. In this form, various electrically insulating, conductive, resistive, and/or inductive viscous materials may be employed. Non-limiting examples of suitable plating mask materials are thixotropic inks, such as, for example, epoxy ink and phenolic ink. In embodiments where the tubular device is a medical tubular device such as a catheter or a stent, the annular band may be formed from a banding material such as an enzyme or a drug delivery composition. Accordingly, various banding compositions may be employed in the present invention, based on the tubular device employed and the effect desired.

FIG. 4 illustrates the apparatus for depositing the banding material 11 on the interior substrate of the tubular device. The apparatus includes a drive member 10 and a deposition nozzle 8 in cooperative engagement with the drive member 10 to provide rotational motion to the nozzle 8. The drive member 10 may be any apparatus that imparts high-speed rotational motion to the nozzle 8, such as an electric motor or an air-operated turbine. One suitable drive member is a dental air turbine commercially available as Model STD CAN1 from Archer & White Handpiece Supercenter, Richardson, Tex. Typically, the drive member 10 provides rotational motion to the nozzle 8 that exceeds 100,000 rpm. In certain embodiments of the present invention, the drive member 10 may impart rotational motion to the nozzle 8 at speeds in the range of 100,000 to 300,000 rpm, and in some embodiments at speeds that exceed 200,000 rpm. The speed of the nozzle 8 may depend on various deposition variables, such as the dispense properties of the material employed, the depth of deposit, inside diameter of the tubular device, and the desired cycle time.

As best illustrated in FIG. 3, the nozzle 8 may be an elongated shaft member having at least one closed end 13 for retention of the banding material 11, and at least one open end 14 for deposition of banding material 11 on the interior substrate of the tubular device. The nozzle 8 may be formed or any resilient material suitable for high-speed deposition applications, such as a plastic, glass, or a metallic material such as, for example, brass, stainless steel, high carbon steel, carbide, and the like. At an end 16 opposite the open end 14, the nozzle 8 may securely engage the drive member 10 by any means known in the art, such as, for example, a conventional chuck, so that operation of the drive member 10 results in rotational motion of the nozzle 8 at the speeds set forth herein. The nozzle 8 may be of any suitable size to be, at least, partially inserted into the opening passing through the tubular device. For example, when the nozzle is inserted into the tubular device, the distance between the outside wall of the nozzle 8 and the inside wall of the opening defined by the interior substrate of the tubular device may be at least 0.005 inches. In one embodiment, the nozzle 8 may have an inside diameter of 0.025 inches, an outside diameter of 0.040 inches, a length of 1.0 inches, and an opening depth in the range of 0.04 to 0.08 inches. To assist in the controlled deposition of the banding material 11 on the interior substrate of the tubular device 1, the nozzle 8 may have a tapered interior wall 18 that defines a bore that slightly widens from the closed end 13 of the nozzle 8 to the open end 14. The interior wall of the nozzle 8 may be tapered such that a cross-sectional diameter a at a distance x from the open end is less than a diameter b at a distance y from the open end 14, and the distance x is greater than the distance y from the open end 14. In this arrangement, as the nozzle 8 rotates the banding material 11, typically in the form of one or more droplets of viscous liquid and positioned at the bottom or closed end 13, more readily travels up the side of the interior wall 18 of the nozzle 8 as the nozzle 8 is rotated by the drive member 10.

The open end 14 of the nozzle 8 may have an arcuate or exponential horn shape 20, as illustrated. This smooth and gradual geometry allows the banding material 11 to travel towards the edge of the open end 14 at an angle that is substantially 90° from the elongate axis of the nozzle 8, and allows the banding material 11 to increase its velocity at a time just prior to its deposition on the interior substrate of the tubular device. In addition, this arrangement may allow the banding material 11 to smoothly transition from the nozzle 8 onto the interior substrate of the tubular device to provide a more controlled deposition when extremely narrow band width tolerances are desired.

As illustrated in FIG. 4, a desired amount of banding material 11 may be loaded into the nozzle 8 through any means known in the art, such as through the use of an applicator 9. The applicator 9 may be, for example, an air syringe. It is also contemplated that the nozzle 8 may be automatically, rather than manually, loaded with the banding material 11 from, for example, a supply source, such as a cartridge loaded with banding material 11, that is in fluid communication with the nozzle 8 (not shown). Although any desired amount of banding material 11 may be employed in the present invention, as described in detail below, because the annular band width may be relatively small, the amount of banding material 11 employed in the present invention may also be small. Typically, the volume of banding material 11 employed in the present invention depends on the band width desired and the diameter of the tubular device. For example, in one embodiment, deposition of a desired band width of 0.03 inches on an interior substrate of a tubular device having an inside diameter of 0.09 inches, may require approximately 140 nanoliters of banding material 11.

When the tubular device is a tubular capacitor 1 and the banding material 11 is a plating mask, prior to the deposition of the plating mask, on the interior substrate of a capacitor 1, the interior substrate and exterior surface of the capacitor 1 may, optionally, be cleaned, such as by acid etching, rinsed, and sensitized as known to those of skill in the art. Sensitizing may be performed with one or more compositions comprising at least one metal halide. The sensitizing composition may be employed in place of the fired on metal layer traditionally employed in the capacitor formation process. The sensitizing and subsequent plating steps reduce control and sag problems associated with the application of a fired on metal layer, and eliminate the drying and firing steps. The sensitizing composition may be applied to the capacitor 1 in the form of a metal halide bath. The metal halide may be various commercially available sensitizing compositions, such as stannous chloride, palladium chloride, and combinations thereof. An optional second sensitizing bath may be applied to the interior substrate and exterior surface of the capacitor 1 to provide a suitable level of surface treatment to the capacitor 1 for further processing and deposition. In this manner, subsequent formation of the capacitor electrodes 4, 5, 6, and 7 may be deposited in the absence of a fired-on metal layer as known to those of skill in the art.

As illustrated in FIGS. 4–5, rotation of nozzle 8, loaded with banding material 11, by attached drive member 10 allows the deposition of one or more annular bands 3 on the interior substrate of the tubular device. Although deposition of the banding material 11 may be accomplished in various orientations and angles, the tubular device may be held in a fixed vertical position for deposition, as illustrated.

By way of illustration only, and not by way of limitation, deposition of the banding material 11 will be described in an embodiment wherein the tubular device is a tubular capacitor 1 and the banding material 11 is a masking material. In this form, a controlled amount of a viscous electrically insulating material to act as the plating mask may be dispensed into the nozzle 8. An elastomer seal 12 may be positioned on the top of the capacitor 1 to minimize vortices and extraneous air currents. The nozzle 8 may be inserted into the inside diameter of capacitor 1 at a location substantially equidistant from the wall of the interior substrate. The nozzle 8 may be inserted into the capacitor 1 to any precise depth and location desired. In embodiments of the present invention, the nozzle 8 may be inserted into the capacitor 1 to a depth of up to one inch, may be inserted to a depth ranging from 0.09 to 1.0 inches, and in some embodiments may be inserted to a depth ranging from 0.15 to 0.3 inches. Following placement of the nozzle 8 into the capacitor 1, the opposite end 22 of the capacitor 1 may be sealed to minimize the vortices created by the rotation of the nozzle 8. The drive member 10 may then be activated and brought up to a rotational speed in excess of 100,000 rpm, and in some embodiments to over 200,000 rpm. When the open end 14 of the nozzle 8 is an exponential horn-shaped applicator, some lag in the movement of the masking material 11 during the initial "spin-up" (i.e., gradual increase from full stop to full rotation) may occur.

Although not intending to be bound by a particular theory, when the drive member 10 is an air turbine and has achieved a suitable nozzle speed, ultrasonic waves may be generated from the pulsation of the thrust of the impeller. As the nozzle 8 begins rotational "spin-up", centrifugal action causes the masking material to move up the tapered interior wall 18 toward the apex of the open end 14. It is believed that when rotation of the nozzle 8 exceeds a particular velocity, ultrasonic action causes a decrease in the masking material viscosity, thereby increasing the ejection velocity from the open end 14. When the nozzle 8 reaches a critical velocity, the masking material 11 is released by centrifugal action, and then, upon deposition, quickly returns to its static thixotropic state. A sonochemical action may cause a viscosity reduction in a thixotropic material.

The masking material 11 may be disposed onto the surface of the interior substrate of the tubular capacitor 1 in a defined annular band 3, as illustrated. Employing the process of the present invention, band widths of 0.01 to 0.08 inches may be achieved by varying the volume of masking material 11 dispensed into nozzle 8. In addition, band widths can be held to within +/−0.010 inches tolerance, and in some embodiments may be held to +/−0.005 inches tolerance. Typical cycle times, from "spin-up" through deposition and "spin down" (i.e., gradual velocity decrease from full rotation to full stop) may be less than 2.0 seconds, and in some embodiments may be less than 1.2 seconds. To further reduce the cycle time, an air pulse may be injected into the exhaust port of the turbine, analogous to the reverse thrust of an airplane, to quickly reduce the kinetic. Following deposition of the plating mask, the tubular capacitor 1 may be dried or cured by processes well know to those of skill in the art, as dictated by the masking material employed.

This process may be repeated where it is desired to deposit more than one annular band 3 on the interior substrate of the capacitor 1. In embodiments employing two annular bands 3 (FIG. 2) in a single component capacitor, the metallic center electrode 7 enhances RF rejection and provides advantages over single band devices. In addition, multiple capacitive and inductive elements can be combined within a single tubular device 1 to produce RF filters with higher insertion loss than conventional designs.

Following deposition of one or more annular bands 3 on the interior substrate, and as illustrated in FIGS. 1 and 2, annular bands 2 of an insulating material having a composition that is the same or different from the masking material 11 may be deposited onto the outside diameter of the capacitor 1. The capacitor 1 may be dried or cured to mask or inhibit the deposit of the subsequent electroless metallic plating, using any suitable process known to those of skill in the art. This process electrically isolates the outside diameter electrode from the inside diameter electrodes.

The tubular capacitor 1 may then be processed through typical electroless and electro metallic plating process to form the capacitor electrodes 4, 5, 6, and 7. For example after deposition of the plating mask, the capacitor 1 may be subjected to a deposition of an electrically conductive first composition such as, for example, an electroless composition known to those of skill in the art. For example, electroless compositions suitable for use in the present invention are commercially available under the tradename Niklad 752 from MacDermid, Inc., Waterbury, Conn. Typically, the electroless composition contains a conductive metal such as, for example, copper, cobalt, nickel, gold, palladium, or combinations thereof. The electroless composition may be deposited by placing the tubular device in a bath of electroless material. The electroless material may be deposited over substantially the entirety of the interior and exterior of the substrate, substantially adhering to only those areas that do not include the applied plating mask, and acts as a first conductive layer over the interior substrate. When only one plating mask is deposited on the interior substrate, two capacitor electrodes are deposited or formed on the interior substrate in the presence of the plating mask and separated from one another by the plating mask (FIG. 1). In like manner, in embodiments having two or more plating masks deposited on the interior substrate, three or more capacitor electrodes are deposited on the interior substrate and separated from each other by each deposited plating mask (FIG. 2).

Following deposition of the electroless composition, the tubular capacitor 1 may undergo a rinse with, for example, $H_2O$. An optional second electrically conductive layer may then be deposited from a second composition over at least a portion of the first layer employing methods known to those of skill in the art. The second composition may be, for example, any known electro metallic composition known to those of skill in the art. Electro metallic compositions suitable for use in the present invention are commercially available from Enthone, Inc., West Haven, Conn. Typically, the electro metallic composition contains a conductive metal such as, for example, copper, cobalt, nickel, gold, palladium, tin, lead, silver or combinations thereof. The electro metallic composition may be deposited over at least a portion of the first layer by placing the tubular capacitor 1 in an electroplating bath of electro metallic material. The electro metallic material may be deposited over substantially the entirety of the first layer, but will substantially not adhere to those areas having the applied plating mask. When only one plating mask is deposited on the interior substrate, two multiple layered capacitor electrodes are formed on the interior substrate in the presence of the plating mask and separated from one another by the plating mask (FIG. 1). In like manner, in embodiments having two or more plating masks deposited on the interior substrate, three or more multiple layered capacitor electrodes are deposited on the interior substrate and are separated from each other by each deposited plating mask (FIG. 2).

Following deposition of the optional second composition, an third electrically conductive layer may be deposited from a third composition over at least a portion of the second layer, if present. Otherwise, the third composition is deposited over at least a portion of the first layer. The third composition may be, for example, a metal plating composition known to one of skill in the art. Metal plating compositions suitable for use in the present invention are commercially available from Enthone, Inc., West Haven, Conn. Typically, the metal plating composition contains a conductive metal such as, for example, copper, tin, silver, gold, lead, or combinations thereof. The metal plating composition may be deposited over at least a portion of the first (or second) layer by placing the tubular device in a bath of metal plating material. The metal plating material may be deposited over substantially the entirety of the first (or second) layer, but will substantially not adhere to those areas having the applied plating mask. When only one plating mask is deposited on the interior substrate, two multiple layered capacitor electrodes 5, 6 may be formed on the interior substrate in the presence of the plating mask and separated from one another by the plating mask (FIG. 1). In like manner, in embodiments having two or more plating masks deposited on the interior substrate, three or more multiple layered capacitor electrodes 5, 6, and 7 may be deposited on the interior substrate and are separated from each other by each deposited plating mask (FIG. 2).

When the tubular device is a tubular capacitor 1, following deposition of all desired electrically conductive coating layers, the plating mask may, but need not, be removed using a stripping solution known to those of skill in the art.

Figure 6:
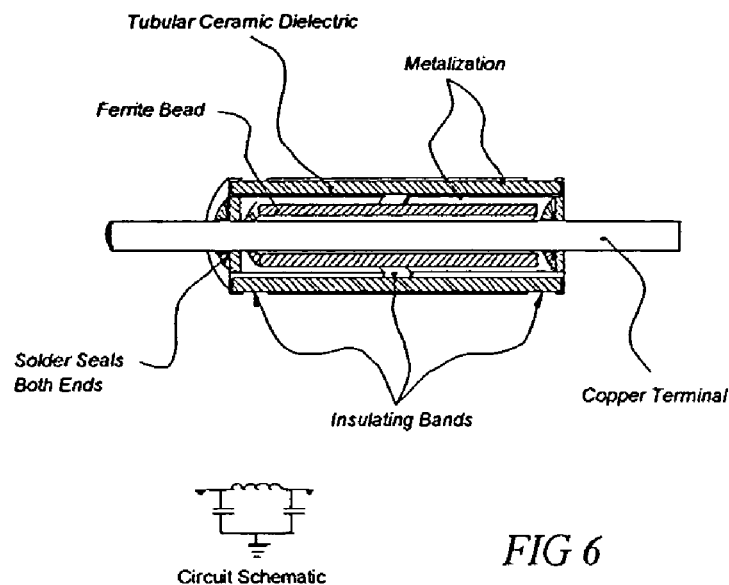
FIG. 6 is a cross section view of a tubular Pi filter employing the tubular capacitor of FIG. 1.
Figure 7:
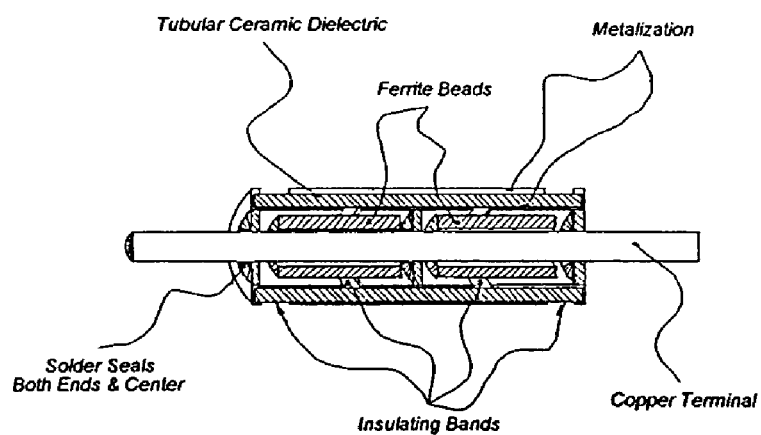
FIG. 7 is a cross section view of a multi-section filter employing the tubular capacitor of FIG. 2.

The present invention provides a cost-effective method to deposit annular bands 3 on the interior substrate of a tubular device with relatively high speed and accuracy. In the electronics industry, this is particularly applicable to the manufacture of tubular Pi capacitors, which may be used to manufacture RFI/EMI filters in Pi configurations (FIG. 6). In addition the present invention provides the ability to place multiple bands on the interior substrate of a single component device to create a tubular capacitor with a plurality of capacitor sections to create multi-section EMI/RFI filters (FIG. 7). When employed with small diameter tubular devices, the annular bands may be deposited into the opening up to one inch from its end at the speeds and diameters set forth herein. Accordingly, if it is desired to mask a tubular device with a center band, approximately a two-inch long tubular device may be employed. Where multiple bands are desired, significantly longer tubular devices may be employed.

The present invention may be used in various electronic devices employing high frequency applications such as wireless transmission equipment, aerospace/avionics devices, cellular system devices, satellite communications equipment, HV power supplies, broadcast transmitters, broadband equipment, computers and peripherals, cable television equipment, electronic subassembly devices, equipment used in telecom systems, test equipment, antennas, medical equipment, consumer electronics/appliances, automated machinery, marine systems devices, automotive equipment, military devices, general equipment or devices that generate RF, and equipment or devices that are susceptible to RF interference. In addition, the present invention may find use in various other fields of technology that may find it desirable to employ banded small diameter tubular devices, such as, for example, catheters and stents in the medical industry.

Accordingly, although the foregoing description has necessarily presented a limited number of embodiments of the invention, those of ordinary skill in the relevant art will appreciate that various changes in the configurations, details, materials, and arrangement of the elements that have been herein described and illustrated in order to explain the nature of the invention may be made by those skilled in the art, and all such modifications will remain within the principle and scope of the invention as expressed herein in the claims. In addition, although the foregoing detailed description has been directed to an embodiment of the apparatus and method of banding a tubular device in the form of a tubular capacitor, it will be understood that the present invention has broader applicability and, for example, may be used in connection with all tubular devices. All such additional applications of the invention remain within the principle and scope of the invention as embodied in the claims.

The invention claimed is:

1. A method of forming at least two capacitor electrodes on an interior substrate defining an opening through a tubular capacitor, comprising:

depositing at least one plating mask on the interior substrate from a plating mask composition; and depositing an electrically conductive first composition on the interior substrate such that at least two capacitor electrodes are formed on the substrate and separated by the at least one plating mask.

2. The method of claim 1, wherein the plating mask is deposited by centrifugal motion by a plating mask applicator.

3. The method of claim 2, wherein the centrifugal motion is provided by an air turbine.

4. The method of claim 3, further comprising injecting an air pulse into an exhaust of the air turbine following deposition of the plating mask.

5. The method of claim 1, wherein the plating mask is a material selected from the group consisting of epoxy ink and phenolic ink.

6. The method of claim 1, wherein the opening has a circular cross section and a diameter of up to 0.75 inches.

7. The method of claim 6, wherein the diameter of the opening ranges from 0.04 to 0.3 inches.

8. The method of claim 7, wherein the diameter of the opening ranges from 0.04 to 0.10 inches.

9. The method of claim 1, wherein at plating mask is deposited at a cycle time of less than 2 seconds.

10. The method of claim 9, wherein the plating mask is deposited at a cycle time of less than 1.2 seconds.

11. The method of claim 1, wherein the plating mask is deposited at a band width tolerance of +/−0.010 inches.

12. The method of claim 11, wherein the plating mask is deposited at a band width tolerance of +/−0.005 inches.

13. The method of claim 1, wherein the plating mask is deposited at a distance of up to 1.0 inch from the end of the tubular capacitor.

14. The method of claim 13, wherein the plating mask is deposited at a distance ranging from 0.09 to 1.0 inches from the end of the tubular capacitor.

15. The method of claim 14, wherein the plating mask is deposited at a distance ranging from 0.15 to 0.3 inches from the end of the tubular capacitor.

16. The method of claim 1, further comprising sensitizing a surface of the substrate prior to the depositing the first composition.

17. The method of claim 16, wherein the surface is sensitized with a composition comprising at least one metal halide selected from the group consisting of stannous chloride, palladium chloride, and combinations thereof.

18. The method of claim 1, further comprising:
sensitizing a surface of the interior substrate with a first metal halide bath; and
sensitizing the surface with a second metal halide bath, the sensitizing with the first and the second metal halide bath occurring prior to the depositing the first coating layer.

19. The method of claim 1, wherein forming the electrodes further comprises:
depositing from the first composition a first coating layer on the interior substrate in the absence of a fired on metal layer; and
depositing from a second composition a second coating layer over at least a portion of the first coating layer.

20. The method of claim 19, wherein the first composition is an electroless composition.

21. The method of claim 20, wherein the first composition is deposited directly on the interior substrate.

22. The method of claim 19, wherein the first composition comprises a metal selected from the group consisting of copper, cobalt, nickel, gold, palladium, and combinations thereof.

23. The method of claim 22, wherein the first composition comprises nickel.

24. The method of claim 19, wherein the second composition comprises a metal selected from the group consisting of copper, tin, silver, gold, lead, and combinations thereof.

25. The method of claim 24, wherein the second coating layer is silver plated layer.

26. The method of claim 19, wherein the first composition is deposited on the internal substrate from a bath containing the first composition.

27. The method of claim 26, wherein the second composition is deposited over at least a portion of the first composition from a bath containing the second composition.

28. The method of claim 19, further comprising depositing a third coating layer from a third composition between the first coating layer and the second coating layer.

29. The method of claim 28, wherein the third composition is deposited from a bath containing the third composition.

30. The method of claim 28, wherein the third composition comprises a metal selected from the group consisting of copper, cobalt, nickel, gold, palladium, tin, lead, silver, and combinations thereof.

31. The method of claim 1, further comprising depositing at least two plating masks on the interior substrate, the plating masks spaced apart by a predetermined distance.

* * * * *